Aug. 31, 1943.    R. ROBERTS    2,328,297
FISH STOP
Filed April 17, 1941    2 Sheets-Sheet 1
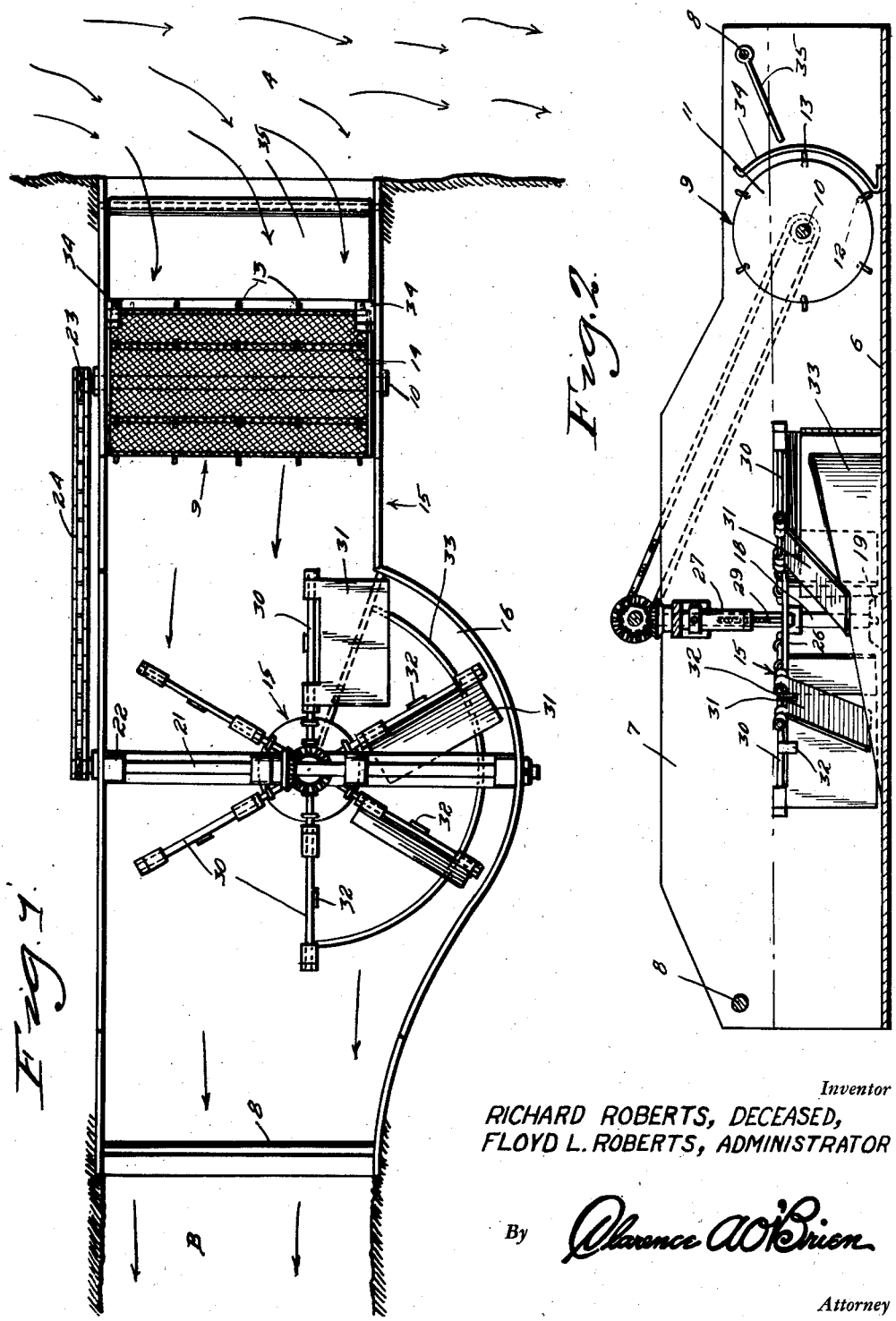
Inventor
RICHARD ROBERTS, DECEASED,
FLOYD L. ROBERTS, ADMINISTRATOR
By *Clarence A. O'Brien*
Attorney Aug. 31, 1943.   R. ROBERTS   2,328,297
FISH STOP
Filed April 17, 1941   2 Sheets-Sheet 2

Inventor
RICHARD ROBERTS, DECEASED,
FLOYD L. ROBERTS, ADMINISTRATOR

By Clarence A O'Brien

Attorney

Patented Aug. 31, 1943

2,328,297

UNITED STATES PATENT OFFICE 2,328,297

FISH STOP

Richard Roberts, deceased, late of Cokeville, Wyo., by Floyd L. Roberts, administrator, Cokeville, Wyo., assignor to Ray B. Roberts, Kemmerer, Wyo.

Application April 17, 1941, Serial No. 389,092

1 Claim. (Cl. 210—173)

This invention relates to fish stops for the prevention of fish passing beyond a selected place in a body of water and is especially adapted for use at the mouth of an irrigation ditch to prevent fish from the main body of water from passing with said water into the ditch.

The primary object of this invention is the provision of a device of the above stated character which may be easily set up for operation in a ditch for the purpose specified and which will not unduly check the flow of water into the ditch and will be self-cleaning of debris, utilizing the flow of the water for its operation.

With these and other objects in view as will become more apparent as the description proceeds, the invention consists in certain novel features of construction, combination and arrangement of parts as will be hereinafter more fully described and claimed.

For a complete understanding of the invention, reference is to be had to the following description and accompanying drawings, in which Figure 1 is a top plan view illustrating a fish stop constructed in accordance with my invention and showing the installation thereof in an irrigation ditch adjacent to where the latter connects with a main body of water.

Figure 2 is a vertical sectional view illustrating the device.

Figure 3:
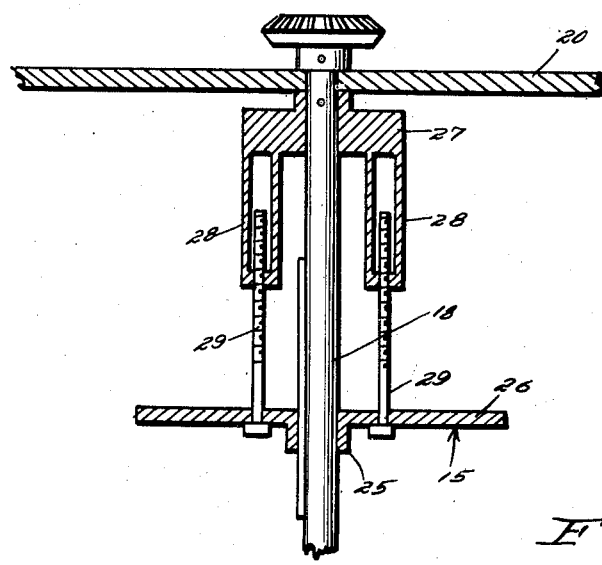
Figure 3 is a detail sectional view illustrating the means for adjusting the water wheel vertically within the flume.
Figure 4:
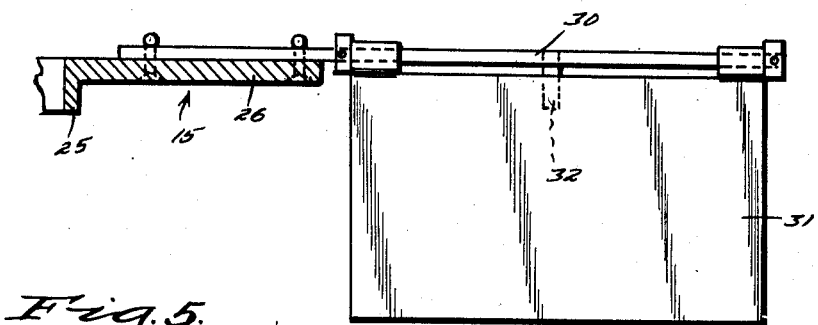
Figure 4 is a side elevation, partly in section, illustrating one of the paddles of the water wheel and its mounting upon the hub of the wheel.
Figure 5:
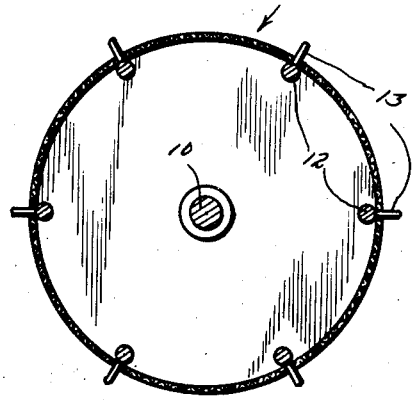
Figure 5 is a transverse sectional view illustrating a cylinder acting as a fish stop.
Figure 6:
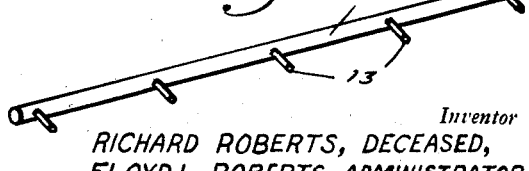
Figure 6 is a perspective view illustrating one of the rods and its fingers forming a part of the cylinder.

Referring in detail to the drawings, the character A indicates a main body of water and B indicates an irrigation ditch connected with said body of water. To prevent fish from passing from the main body of water into the irrigation ditch the present invention is employed and consists primarily of a flume 5 located in the ditch where the latter joins onto the main body of water. The flume includes a bottom wall 6 and side walls 7. The bottom wall rests on the bottom of the ditch and the side walls snugly fit the sides of the ditch so that the water of the ditch must flow entirely through the flume. The side walls are connected by tie rods 8 adjacent the ends of the flume.

Journaled in the flume 5 adjacent the end thereof which is the closest to the main body of water is a rotatable cylindrical fish stop 9. The stop 9 extends transversely of the flume and includes a shaft 10 journaled in the side walls, end discs 11 secured on said shaft and located in close proximity to the side walls 7 of the flume and connected by tie rods 12 located adjacent the peripheries of the discs 11 and on which are formed fingers 13.

The tie rods and discs support foraminous material 14 through which the fingers 13 project. Thus it will be seen that the stop 9 is in the form of a foraminous cylinder which will permit flow of water therethrough and through the flume, still will prevent fish from passing through the flume due to its construction and location in the flume.

The fish stop is adapted for continuous rotation whenever there is a flow of water through the flume and to accomplish this a water wheel 15 is provided for the drive or rotation of the fish stop.

One of the side walls 7 of the flume 5 is offset to form a pocket 16 in which approximately one-half of the water wheel is located while the other half of the water wheel operates in the flow of water through the flume. The water in the pocket naturally will have very much less flow than the water passing directly through the flume and as the non-driving portion of the water wheel is located in said pocket the water retard to the drive of the wheel will be materially reduced. This arrangement will permit the water wheel to develop greater power.

A shaft 18 is journaled vertically in the flume downstream from the fish stop by having its lower end supported by a bearing 19 carried by the bottom wall of the flume. The shaft 18 is further rotatably supported by a member 20 arranged transversely of the flume and supported by the side walls thereof. The upper end of the shaft 18 is geared to a horizontal shaft 21 journaled in bearings 22 on the supporting member 20 and extends through the side walls and has one end connected to the shaft 10 of the fish stop 9 by sprocket gears 23 and an endless sprocket chain 24.

A hub 25 including a disc 26 is splined for vertical movement on the shaft 18 and a supporting member 27 is secured on the shaft 18 above the disc 26 and includes hollow depending arms 28 to which are threaded bolts 29. The bolts 29 are carried by the disc 26 and by adjusting the bolts in the arms 28 the disc 26 can be adjusted vertically on the shaft 18 in either direction.

Rods 30 are secured on the disc 26 and extend radially therefrom and have journaled thereon paddles 31. Suitable means 32 are provided for limiting the journaling of the paddles 31 on the rods 30. The purpose of the limiting means 32 for the paddles 31 is to maintain said paddles in a depending position when acted upon by the flow of water through the flume. However, when the paddles move into the pocket 16 they may be feathered due to the limiting means permitting said paddles to be swung upwardly to present edges thereof to the water as the wheel rotates.

A cam 33 is located in the pocket 16 of the flume, the purpose of which is to bring about feathering of the paddles during their movement through the pocket and permitting said paddles as they move out of the pocket to assume depending position in order that they may be acted upon by the flow of water through the flume. By having the disc 26 adjustable vertically in the flume as heretofore described, the paddles 31 may be raised and lowered with respect to the flow of the body of water through the flume.

Thus it will be seen that the flow of water through the flume acting upon the wheel 15 rotates the fish stop and as the latter is provided with fingers upon its periphery will catch debris and carry the same over the stop, still fish will be checked from passing through the flume.

Guard members of arcuate formation, as indicated at 34, are mounted in the flume upstream from the stop. The guard members are located adjacent the side walls of the flume to prevent foreign matter from entering the spaces between the ends of the fish stop and the side walls of the flume.

A fish check panel 35 of buoyant material is hinged on the tie rod 8 of the flume located upstream from the stop 9. The check panel 35 mounted as described and being buoyant will swing in the direction of the stop 9 by the flow of water through the flume from the main body of water A so as to prevent fish from jumping over the stop. Sufficient space is provided between the free edge of the check plate or panel 35 and the periphery of the stop 9 or the free ends of the fingers 13 as to permit grass and other foreign matter picked up by the fingers to pass with the rotation of the fish stop also the plate or panel being hingedly mounted may swing upwardly if engaged by a large amount of foreign matter carried by the fingers of the stop during its rotation so as to prevent clogging of the device by debris, still preventing fish from jumping over the stop owing to the panel or plate gravitating into a floating position, as shown in Figure 2, as soon as freed of debris.

While the preferred embodiment of the invention has been shown and described, it will be understood that minor changes in construction, combination and arrangement of parts may be made without departing from the spirit and scope of the invention as claimed.

Having thus described the invention, what is claimed is:

In a device of the class described, a flume for conveying water and having a side pocket therein for retarding the passage of water therethrough, a flow operative water power wheel in said flume comprising a shaft journaled in the flume in upright position, a hub forming disk splined on said shaft for vertical adjustment thereon, rods fixed at inner ends thereof on said disk to extend radially therefrom, normally pendent blades vertically swingable on said rods to feather the same and having outer ends rotatable into and out of said pocket to provide for low resistance to rotation of said wheel on one side thereof, means to adjust said hub vertically into different set positions to correspondingly adjust said blades in accordance with variations in the level of the water in said flume comprising a hub supporting member fast on said shaft above the hub and provided with hollow arms depending therefrom, and headed adjusting rods extending upwardly through said disk and threaded into said arms, and means in said pocket to cause swinging of said blades as said outer ends of the blades rotate through the pocket.

FLOYD L. ROBERTS,
Administrator of the Estate of Richard Roberts, Deceased.